(No Model.)
F. A. HETHERINGTON.
FILM OR PLATE CARRIER.
No. 476,203. Patented May 31, 1892.
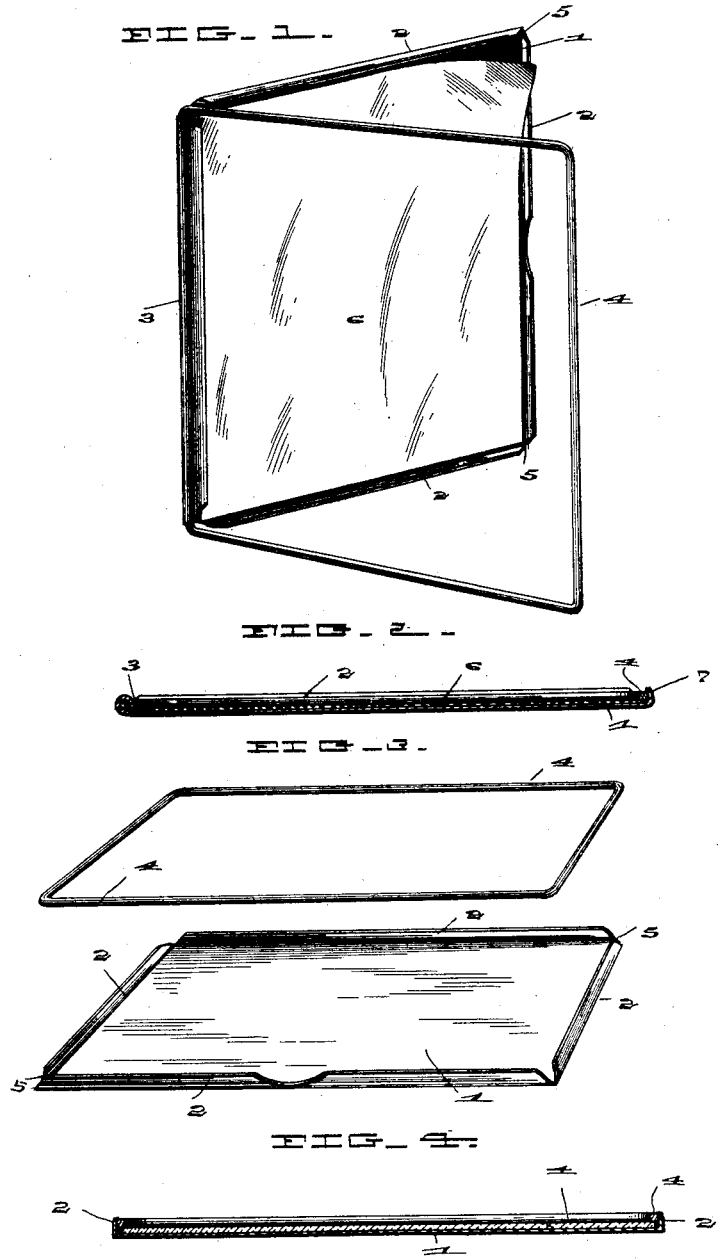
Witnesses
H. D. Nealy.
O. B. Griffith.
Inventor
Frederick A. Hetherington
By his Attorney
C. P. Jacobs,

UNITED STATES PATENT OFFICE.

FREDERICK A. HETHERINGTON, OF INDIANAPOLIS, INDIANA, ASSIGNOR OF ONE-HALF TO THOMAS E. HIBBEN, OF SAME PLACE.

FILM OR PLATE CARRIER.

SPECIFICATION forming part of Letters Patent No. 476,203, dated May 31, 1892.

Application filed December 2, 1891. Serial No. 413,765. (No model.)

*To all whom it may concern:*

Be it known that I, FREDERICK A. HETHERINGTON, of Indianapolis, county of Marion, and State of Indiana, have invented certain new and useful Improvements in Film or Plate Carriers; and I do hereby declare that the following is a full, clear, and exact description thereof, reference being had to the accompanying drawings, in which like figures refer to like parts.

My invention relates to improvements in the construction of holders or carriers for films or glass plates used in taking photographic negatives and will be understood from the following description.

In the drawings, Figure 1 is a perspective view of my improved holder, showing the film in place and the holder open. Fig. 2 is a transverse section through the same as it appears when closed. Fig. 3 is a perspective view of a modification of my device, the wire clamp not being hinged to the frame and adapted to be snapped into place in the holder-frame, which is shown directly below it. Fig. 4 is a transverse section through the same, the wire clamp being in place over a glass plate.

In detail, 1 is the frame, which is preferably made of sheet metal, having flanges 2 turned up on three sides, and at 3 is a lip, which fits down against the plate, forming a hinge-socket in the fold to receive one side of the spring-clamp wire, as shown in Fig. 1. The corners of the flanges are cut away, as at 5, and 6 is the film-sheet. The upper edges of the flanges are turned in, as shown at 7 in Fig. 2, so that the wire clamp when shut down will snap into place and be held by the inwardly-projecting ends of the flanges. The sheet of film is set into the frame against the back thereof, and the wire clamp is then brought down and snapped into place, holding the sheet of film firmly on all sides, the edge of the film being slipped under the lip 3 of the hinge, so as to clamp it on that side.
The modification shown in Figs. 3 and 4 does not affect the operation of the device, the hinging-lip 3 being simply dispensed with and the flanges formed on all sides alike, and the wire clamp is pushed in against the flanges on all four sides when the film or glass has been set in place against the back of the frame.

The modification shown in Fig. 3 is preferable when glass plates are to be used, as the glass plate, being inflexible, could not well pass under the lip 3, and the carrier-frame, being opaque, makes a dark backing for the glass and no light can possibly pass through the plate so as to affect its sensitiveness. It is not very material as to the angle of the upturned flanges, provided they be set close enough to insure the necessary friction between the wire clamp and the inner face of the flange. A piece is preferably cut out of one of the flanges to allow access to the edge of the plate or film, as shown.

What I claim as my invention, and desire to secure by Letters Patent, is the following:

1. A carrier for photographic plates or films, comprising a metal frame 1, having upturned flanges 2 on three sides and a hinging-flange 3 on the other side, in combination with a wire clamp 4, hinged to the frame, adapted to be sprung into such carrier past the edges of the flanges for holding the plate or film in place, substantially as shown and described.

2. A film or plate carrier composed of a frame having upturned flanges upon the sides, one of such flanges cut out to allow access to the edge of the plate or film, in combination with a wire clamp adapted to be set into the frame and bearing frictionally against the sides of the flanges for holding the plate or film in position, substantially as shown and described.

In witness whereof I have hereunto set my hand this 30th day of November, 1891.

FREDERICK A. HETHERINGTON.

Witnesses:
 C. P. JACOBS,
 E. B. GRIFFITH.